A system for monitoring a floating roof of a liquid storage tank and a method for use of the system are described. The system includes linear position measuring devices to determine the vertical location and orientation of the floating roof within the storage tank and one or more transmitters to relay such information to a monitoring, recording, or control device, or to a remote computer network location. Typically, three measuring devices are used, positioned at or near the top of the storage tank and generally equally spaced around the perimeter of the tank. The system and method are useful to monitor the position and inclination of a liquid storage tank floating roof, such as may be used in the petrochemical, chemical and other industries where such storage tanks are in use.

20 Claims, 5 Drawing Sheets

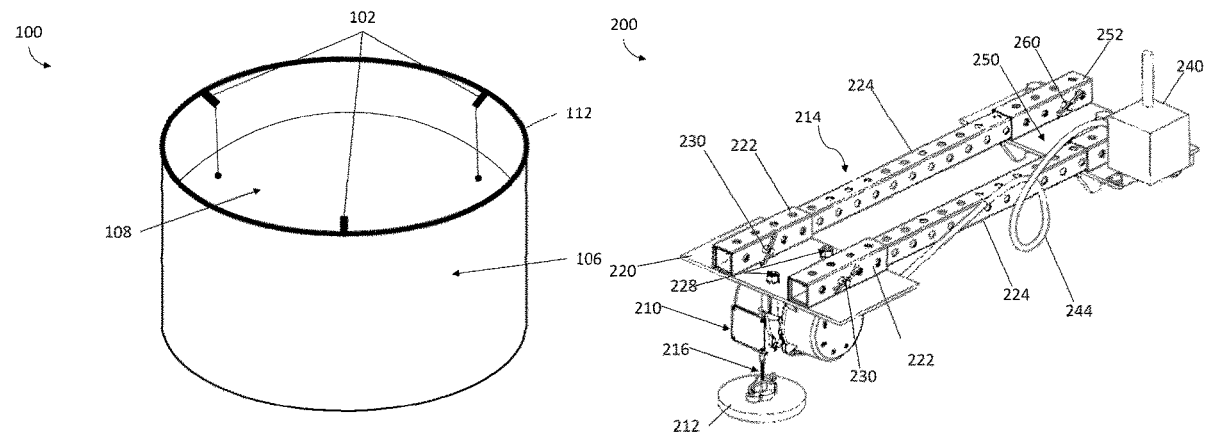

MONITORING SYSTEM FOR FLOATING ROOF STORAGE TANK

CROSS-REFERENCE TO RELATED APPLICATION

This application claims priority under 35 U.S.C. § 119 to U.S. Provisional Patent Application Ser. No. 62/472,710, titled "Monitoring System For Floating Roof Storage Tank" and filed on Mar. 17, 2017. The entire contents of the foregoing application are hereby incorporated herein by reference.

TECHNICAL FIELD

A monitoring system for a floating roof of a liquid storage tank and a method for use of the system are provided. The system and method are useful to monitor the position and inclination of a liquid storage tank floating roof, such as may be used in the petrochemical, chemical, and other industries where such storage tanks are in use.

BACKGROUND

Liquid storage tanks frequently contain floating roofs that float on top of the liquid contained in the tank. Such roofs are vertically displaceable with the addition of liquid to, or removal of liquid from, the tank. Certain industries, such as those associated with petrochemical processing or storage, including refineries, tank terminals and the like, often use floating roofs to minimize product economic losses and for environmental reasons to reduce the emission of volatile hydrocarbons. Floating roofs also protect the product contained within the tank from debris, excess water addition, or other contaminants. For those storage applications involving flammable liquids, floating roofs are used to reduce the risk of fire and/or explosion by reducing the exposed vapor space in the tank above the flammable liquid. Floating roof rim seals and shunts are also frequently used along with a floating roof to minimize the risk of rim fires.

The risk of a severe roof failure accident can be associated with several potential causes, including the lack of adequate overfill warning or notification of an alarm condition. The floating roof may also get stuck at one or more rim locations during filling or emptying of the tank due to icing, the accumulation of debris, or an obstruction at the rim seal. Improperly monitored floating roofs may also experience leaks, excessive snow or water load on the top of the roof, freezing of accumulated or pooled water on top of the roof, or excessive wind pressure. These and other such conditions may lead to failure of the roof or improper position and/or inclination (tilt) of the roof. Safe operation of the storage tank therefore requires a reliable and accurate way to monitor the status, particularly the position and inclination, of a floating roof.

An additional concern for the storage of flammable and/or explosive liquids within the tank, and the monitoring of the floating roof, relates to the use certification for any monitoring or measurement devices used on or near the tank. Importantly, such devices must generally meet the National Fire Protection Association (NFPA) Class 1, Division 1 or more stringent certification requirements where, along with other conditions, ignitable concentrations of flammable gases, flammable liquid-produced vapors, or combustible liquid-produced vapors can exist under normal operating conditions.

Due to the importance of monitoring floating roof operation, including providing accurate and current position and inclination information for floating roofs, and the absence of cost-effective and reliable means for monitoring such roofs, a continuing need exists for improved systems and methods for the cost-effective monitoring of floating roofs in liquid storage tanks.

SUMMARY

The present application is directed to a monitoring system for a floating roof of a liquid storage tank, as well as to a method for using the system. The system comprises at least three linear position measuring devices for measuring the vertical distance from a proximal reference location for each measuring device to a generally vertically-aligned distal location at the top of the floating roof. The measuring devices are spaced around and installed at or near the top perimeter of the storage tank, each measuring device being configured to provide vertical distance measurement information to a monitoring, recording, or transmitting device. The system also includes an adjustable support structure for attaching each measuring device to the storage tank at or near the top perimeter of the storage tank. Each measuring device connects to a separate support structure specifically for that device and the support structures are then connected to the storage tank. The system further includes a transmitter for receiving the vertical distance measurement information from one or more of the measuring devices and for transmitting the information.

The method of the application relates to monitoring a floating roof of a liquid storage tank through the use of the system. The method comprises deploying at or near the top perimeter of a liquid storage tank at least three linear position measuring devices for measuring the vertical distance from a proximal reference location for each measuring device to a vertically-aligned distal location at the top of the floating roof. Each measuring device is configured to provide vertical distance measurement information to a monitoring, recording, or transmitting device. A transmitter is also deployed at the top of the storage tank for receiving the vertical distance measurement information from one or more of the measuring devices and for transmitting the information to a monitoring, recording, or control device, or to a computer network gateway. The measuring devices obtain linear position output information from the one or more measuring devices and provide that information to the transmitter. The transmitter then transmits the information received by the transmitter to a monitoring, recording, or control device, or to a computer network gateway.

The present application is further directed to a method for determining an alarm condition status or status change of a floating roof of a liquid storage tank comprising applying the method of monitoring the floating roof described herein to determine position or inclination values of the floating roof within the storage tank, comparing the position or inclination values to pre-determined set point ranges for alarm status changes to determine if the values are within or exceed the set point ranges, and updating the alarm condition status for the floating roof position or inclination.

BRIEF DESCRIPTION OF THE DRAWINGS

The drawings provided herein are for the purposes of illustration only, and are not intended to limit the disclosure or scope of the claimed invention. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DESCRIPTION OF EXAMPLE EMBODIMENTS

Figure 1A:
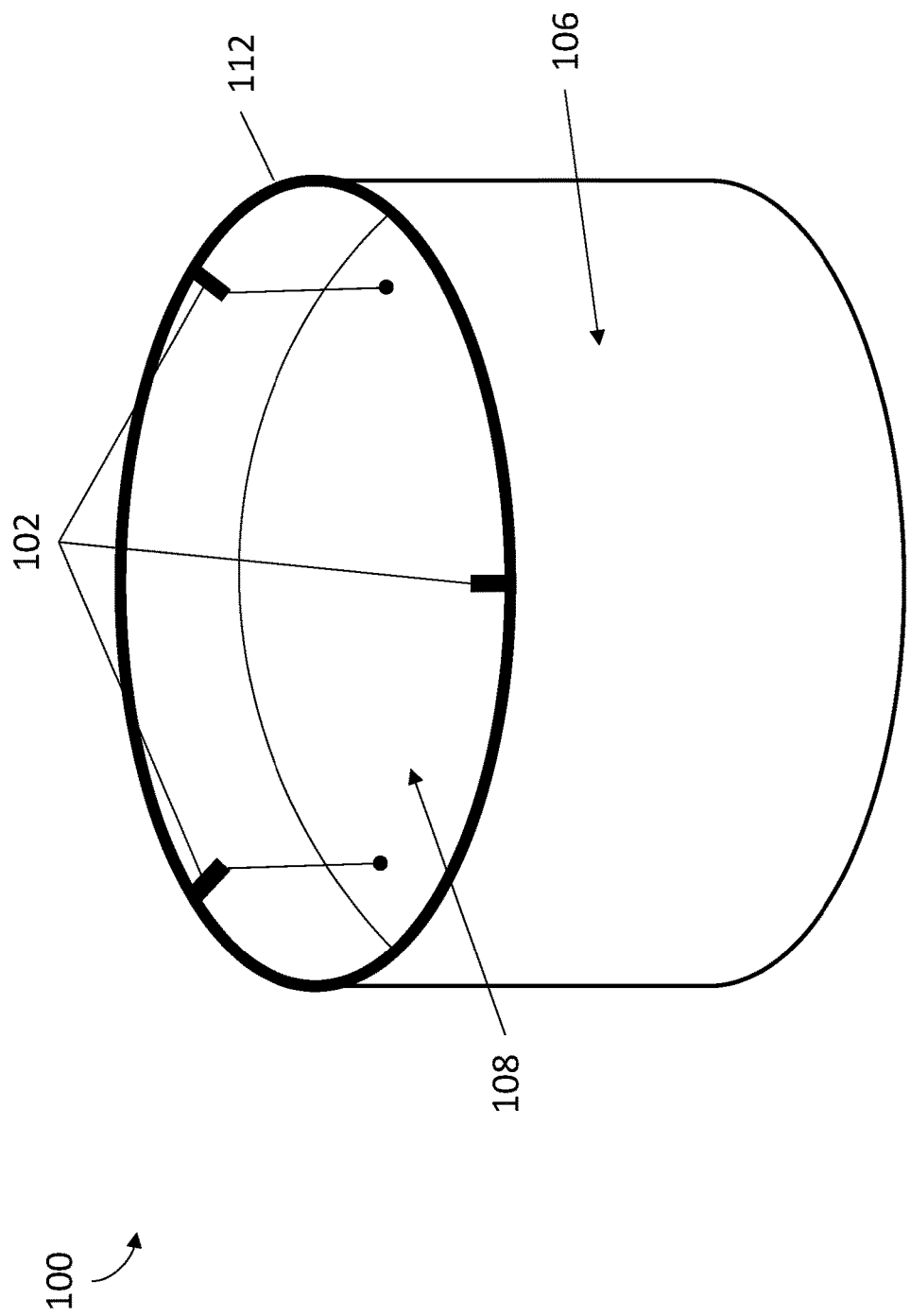
FIG. 1A illustrates a perspective view of a floating roof tank system having a floating roof monitoring system attached to the top of the floating roof tank, according to an exemplary embodiment.

The present application is directed to a monitoring system for a floating roof of a liquid storage tank, as well as to a method for using the system. Specific embodiments and benefits of the invention are apparent from the detailed description provided herein. It should be understood, however, that the detailed description, figures, and any specific examples, while indicating beneficial embodiments, including some that are preferred, are intended for purposes of illustration only and are not to be considered as limiting the scope of the invention.

The disclosure may be better understood by reading the following description of non-limiting, exemplary embodiments with reference to the attached drawings, wherein like parts of each of the figures are identified by the same reference characters. In the following description of the representative embodiments of the invention, directional terms, such as "above", "below", "vertical", "radial", "horizontal", "inner", "outer", "top", "bottom", etc., are used for convenience in referring to the accompanying drawings.

The monitoring system and method utilize at least three linear position measuring devices to measure the vertical distance from a reference location for each measuring device to a vertically-aligned location at or near the top of the floating roof. The reference location is generally proximal in that the reference point location is based on the connection point of the measuring device to the support structure. The vertically-aligned location at or near the top of the floating roof is generally distal in that this location is farther away from the measuring device and the reference point location. The term "vertically-aligned" generally means that the reference location and the corresponding vertical measurement location at or near the top of the floating roof are substantially in vertical alignment, where the term "substantially" means to the extent possible according to normal practices for aligning the measuring devices with the roof top locations during installation.

The measuring devices are spaced around and installed at or near the top perimeter of the storage tank. Typically, the storage tank is cylindrical, and in exemplary embodiments, the devices are equally spaced around the top circumference of the tank. The use of three measuring devices is generally sufficient to monitor the floating roof position and allow the roof position and inclination to be determined. More than three devices may be used if desired, however; for instance, in order to provide an additional measurement of the floating roof location or to provide a backup measurement in the event of a device failure.

The system also includes a support structure for attaching each measuring device to the storage tank at the top perimeter of the storage tank. Each measuring device connects to a separate support structure specifically for that device. The support structures provide a means of attaching the measuring devices to or near the top of the storage tank so that a vertical measurement can be obtained directly to the top of the floating roof. In exemplary embodiments, the support structure is adjustable in length. In certain embodiments, the support structures are adjustable from about 0.5 meter (m) to about 2 m (1.6 feet (ft) to about 6.6 ft) in length. In certain embodiments, the support structures are adjustable from about 0.5 m to about 1 m (1.6 ft to about 3.3 ft) in length. Other lengths may be used, if necessary, in order for the support structure to provide a vertical measurement to a desired location at the top of the floating roof. The measuring devices are typically connected to the support structure through the use of a bracket and/or mounting plate to hold the device in place, or by bolting the device to the support structure. Any other appropriate means for connecting the devices to the support structures may also be used. The mounting bracket components may be machined from stainless steel or coated with the same coating as the tank exteriors to prevent long term corrosion and rusting.

The support structure also generally includes means for secure and non-permanent attachment of the structure to the storage tank. While not limited thereto, one suitable and convenient means to attach the support structure to the tank includes an adjustable bracket that allows the structure to be attached to differing tank wall and rim thicknesses, and without modification to the tank whatsoever.

Suitable measuring devices include any device capable of directly measuring the vertical distance from the reference location to the vertically-aligned location on the top of the roof. Typically, a mechanical measurement device is used. Such devices are cost-effective, reliable, relatively maintenance-free, and provide an accurate measurement over the entire vertical range of motion of the floating roof. While not necessarily limited, the vertical displacement of floating roofs over a range of up to about 12 m (about 40 ft) or more means the corresponding measurement range of the measuring device should be from about 0 m to about 20 m (0 ft to about 65 ft), and more particularly, from about 0 m to about 15 m (0 ft to about 50 ft). Other types of measuring devices to measure the vertical distance to the roof top may also be used, including those based on optical or acoustic measurements.

A particularly useful mechanical measuring device is a wire or cable drawn linear transducer. Such devices provide an energy efficient, potentiometric absolute linear position measurement. While the devices may be powered from an outside electrical source, they are typically battery powered, intrinsically safe, and thereby simplifying installation and service, particularly where NFPA Class 1, Division 1 service rating is required. They also allow a sleep mode of operation, an important power saving capability that enables a means to power on and off the device and to provide intermittent position information when a status update is requested, for example, from a computer network monitoring program. Useful wire drawn transducers are available from commercial suppliers, for example, see linear position device supplier UniMeasure, http://www.unimeasure.com. In certain alternative embodiments, an optical encoder may be used in lieu of a potentiometric measuring device.

The measuring device is generally configured to provide vertical distance measurement information to a monitoring, recording, or transmitting device. Typically, such configuration means the device provides an electrical output value that is linearly related to the vertical distance measurement from the proximal reference location to the distal location at the top of the floating roof. In the case of a wire drawn transducer, the output usually varies linearly with distance over a 4 milliampere (mA) to 20 mA range. The device may also provide digital or other output rather than an electrical analog output. Useful monitoring or recording devices include dedicated devices such as strip or other chart recorders, or an external computer system. Useful measuring devices include those that are wired or wireless with regard to external transmission of output values from the measuring device. Although the measuring device typically provides a wired output connection to the transmitting device, it may also be connected wirelessly.

The system further includes a transmitter for receiving the vertical distance measurement information from one or more of the measuring devices and for transmitting the information. Such devices are available commercially and typically receive output information from measurement devices and relay that information by transmitting it to another transmitter, or to a monitoring, recording, or computer network system. It is generally preferred to transmit output information from the measuring devices to a computer network gateway so the information can be used in a computer system monitoring program to determine position and inclination values for the floating roof. The transmitter interfaces with the 4-20 mA output of the cable transducer directly, thereby conveying the tank level information to a remote monitoring computer for monitoring and assessment.

The monitoring system and method of the present application provide certain advantages for monitoring floating roofs in liquid storage tanks. Such benefits include: low equipment, installation, operational, and maintenance costs, simplicity of design and maintenance, high accuracy and reliability of information for the location of the floating roof, and high in-service reliability of the system. In addition, the monitoring system and method of the present application provides for near-real-time indication of floating roof health.

Installation of the monitoring system is straightforward. The measuring device may be pre-connected to the support structure so that the on-tank installation entails locating and deploying the measuring devices at appropriate locations around or near the top perimeter of the tank. For example, one convenient location is to attach the support structure to the top edge of the tank so that the measuring device proximal reference location is at or close to the top of the tank. The distal location at the top of the roof can be located in conjunction with the spacing of the support structures around the tank top perimeter so that any structures or obstructions on the roof are avoided. The roof location is typically kept in substantially vertical alignment with the reference location for the measuring device. Installation of wire drawn transducers as the measuring devices includes extending and attaching the device measuring wire to the floating roof top. Any attachment means may be used, including, e.g., a magnetic coupling base, bolting the wire to a corresponding attachment point, or adhesively bonding the wire or an attachment connector to the roof. Advantageously, the installation may be performed without interfering with the use or operation of the storage tank and normal storage tank work safety precautions may usually be maintained during installation.

Figure 1B:
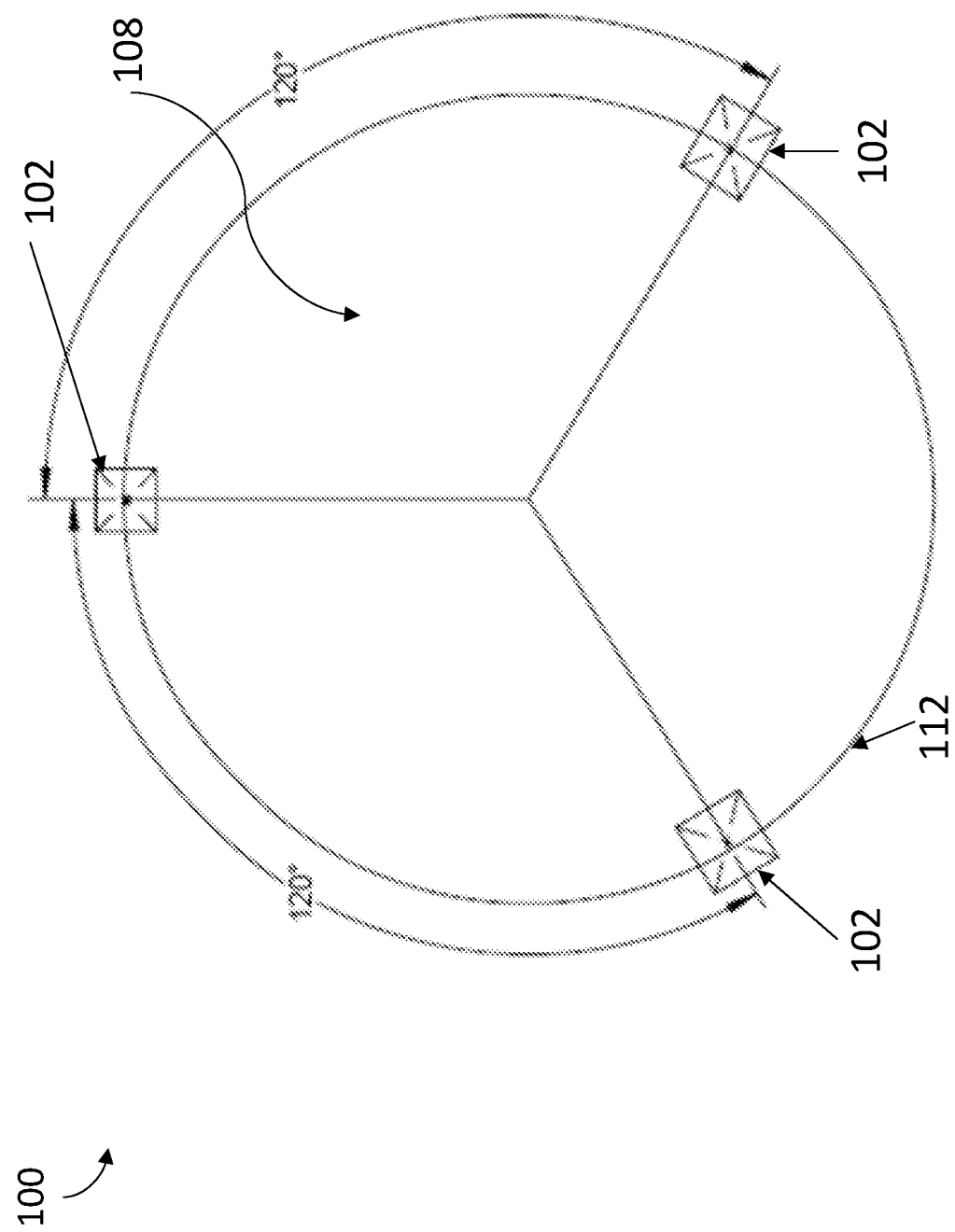
FIG. 1B illustrates a top view of the floating roof tank system of FIG. 1A, according to an exemplary embodiment.

FIGS. 1A-1B show a floating roof tank system 100 illustrating an exemplary embodiment of the general configuration of a monitoring system 102 coupled to a storage tank 106 having a floating roof 108. The monitoring system 102 includes three measuring devices spaced around a top edge perimeter 112 of the storage tank 106. In certain exemplary embodiments, each measuring device is equally spaced around the perimeter 112 using support structures (shown in FIGS. 2A-2B and 3).

Figure 2A:
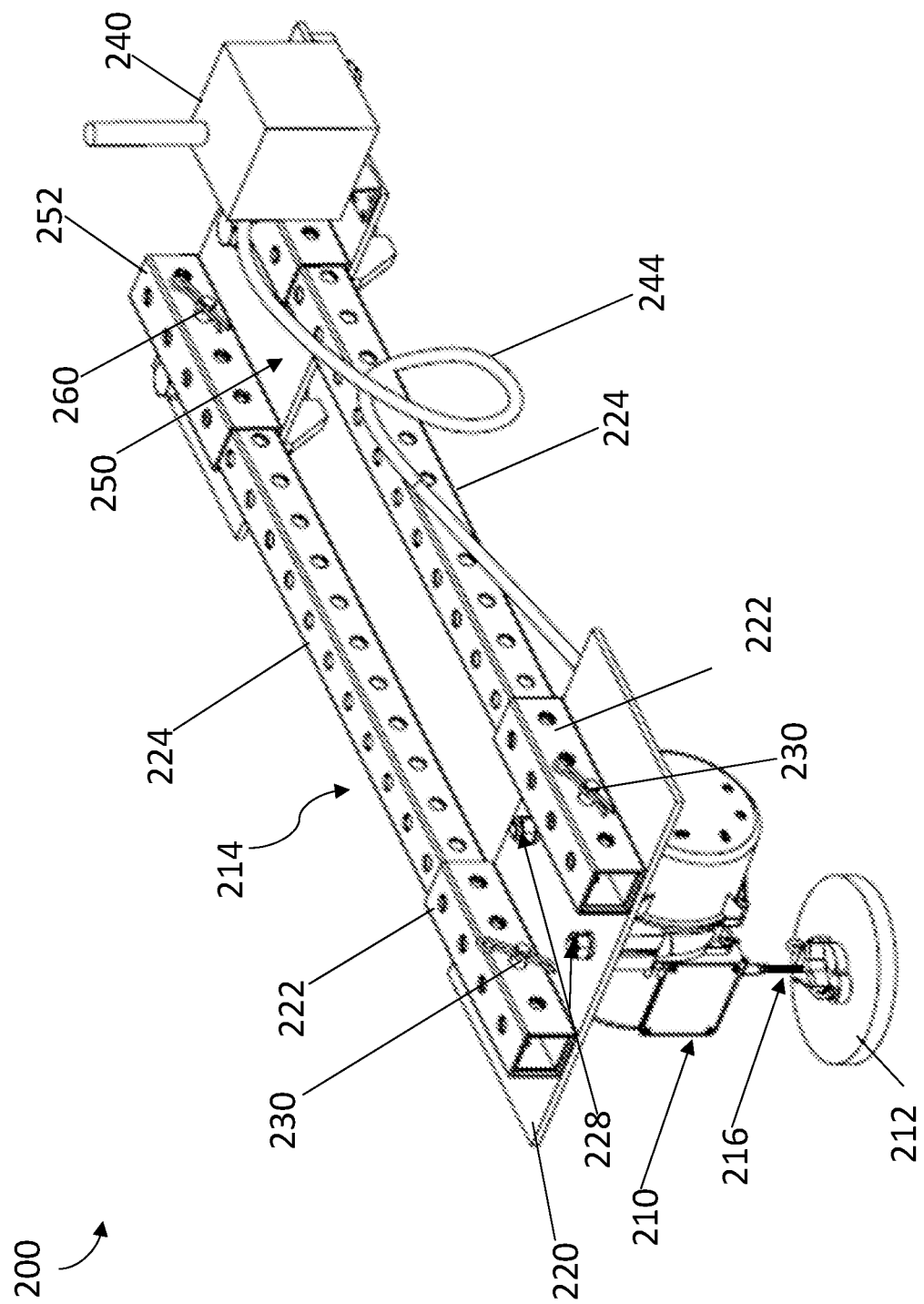
FIG. 2A illustrates a top perspective view of a floating roof monitoring system having a measuring device and support structure attached to a floating roof tank edge, according to an exemplary embodiment.
Figure 2B:
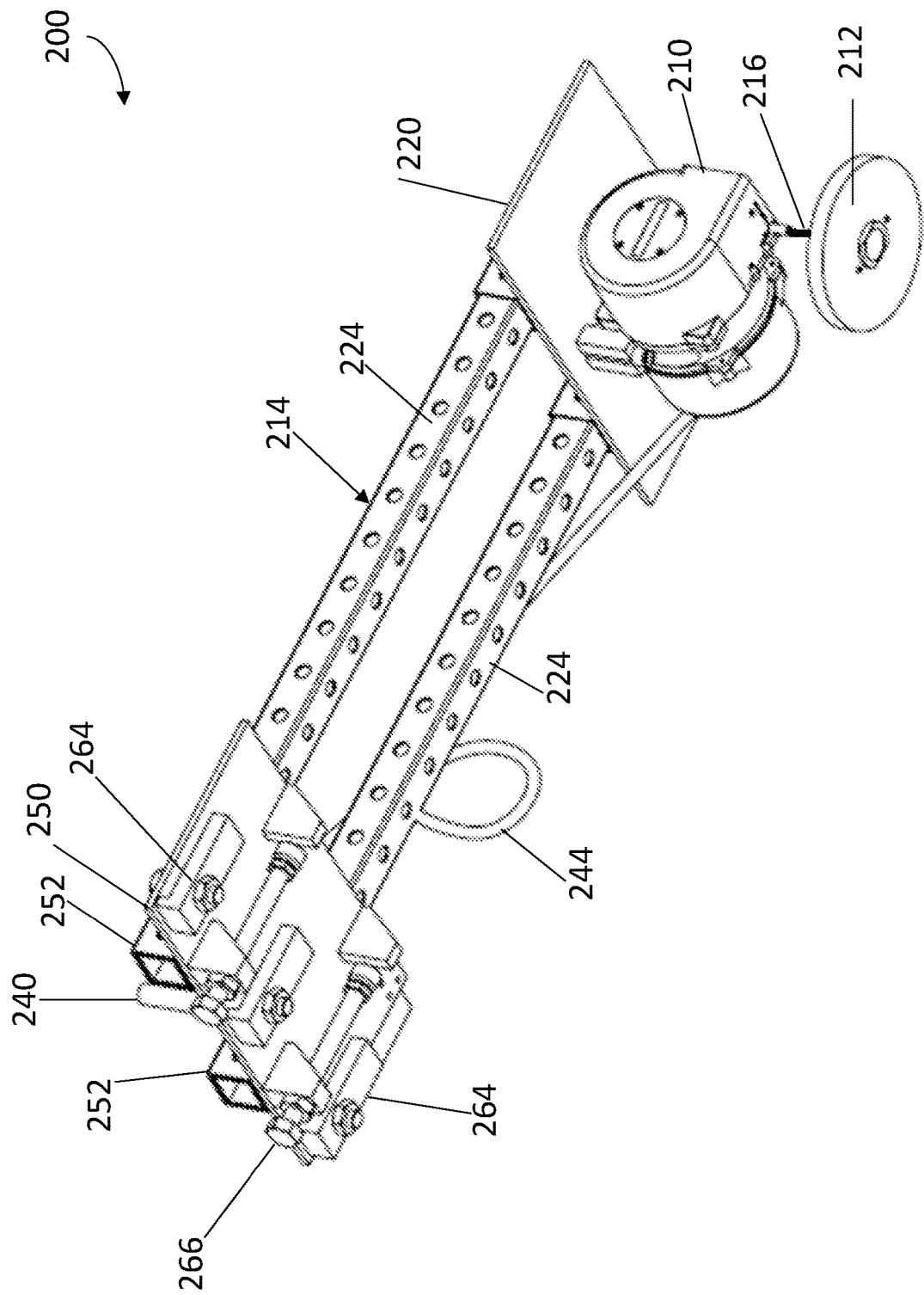
FIG. 2B illustrates a bottom perspective view of the floating roof monitoring system of FIG. 2A, according to an exemplary embodiment.

FIGS. 2A-2B show a floating roof monitoring system 200 having a measuring device 210 and support structure 214 for attachment to a floating roof tank edge (not shown). In certain exemplary embodiments, the measuring device 210 is a wire drawn cable transducer having a cable or wire 216 that extends from the cable transducer measuring device 210 to a magnetic attachment disk 212 for coupling to a top of a floating roof 108 of a tank 106 (FIGS. 1A-1B). The wire 216 is generally positioned as vertical as possible and is away from contact with any obstruction or object within the tank 106. The measuring device 210 is shown attached to the support structure 214 using a mounting plate 220. The mounting plate 220 includes two mounting brackets 222 (FIG. 2A) corresponding to and configured to engage cantilever supports 224 of the support structure 214. In certain embodiments, the mounting brackets 222 are welded to the mounting plate 220. In other embodiments, the mounting brackets 222 may be configured to slide over and be pinned in place to accommodate varying tank sizes. In certain exemplary embodiments, the cantilever supports 224 can be extended to a desired length to align with the mounting position of a cable attachment base (not shown) on top of the floating roof 108 of tank 106. In certain exemplary embodiments, the cable attachment base may be magnetically coupled to the floating roof if the roof contains magnetic materials. The measuring device 210 may be secured to the mounting plate 220 using any suitable fastening means, such as screws 228 (FIG. 2A). The mounting brackets 222 of the mounting plate 220 may be secured to the cantilever supports 224 of the support structure 214 using any suitable fastening means, such as clevis pins 230 (FIG. 2A).

The system 200 also includes a wireless transmitter 240 that is attached to the support structure 214 to allow the output information from the cable transducer measuring device 210 via cable connector 244 to be relayed to a monitoring location, e.g., a computer network gateway (not shown). The wireless transmitter 240 is shown attached to the support structure 214 using a mounting plate 250. The wireless transmitter 240 may be secured to the mounting plate 250 using any suitable fastening means, such as nuts, bolts, rivets, welded brackets, studs, glue, or other suitable adhesive. The mounting plate 250 includes two mounting brackets 252 corresponding to and configured to engage cantilever supports 224 of the support structure 214. The mounting brackets 252 of the mounting plate 250 may be secured to the cantilever supports 224 of the support structure 214 using any suitable fastening means, such as clevis pins 260 (FIG. 2A). The mounting plate 250 also includes vertical clamps 264 (FIG. 2B) and radial clamps 266 (FIG. 2B) positioned on a side opposite the mounting brackets 252 for attaching to a tank edge.

One having ordinary skill in the art will recognize that the components of the support structure can be designed and configured any number of ways to allow for attachment of a measuring device to the tank edge. In addition, the mounting bracket components may be machined from stainless steel or coated with the same coating as the tank exteriors to prevent long term corrosion and rusting.

Figure 3:
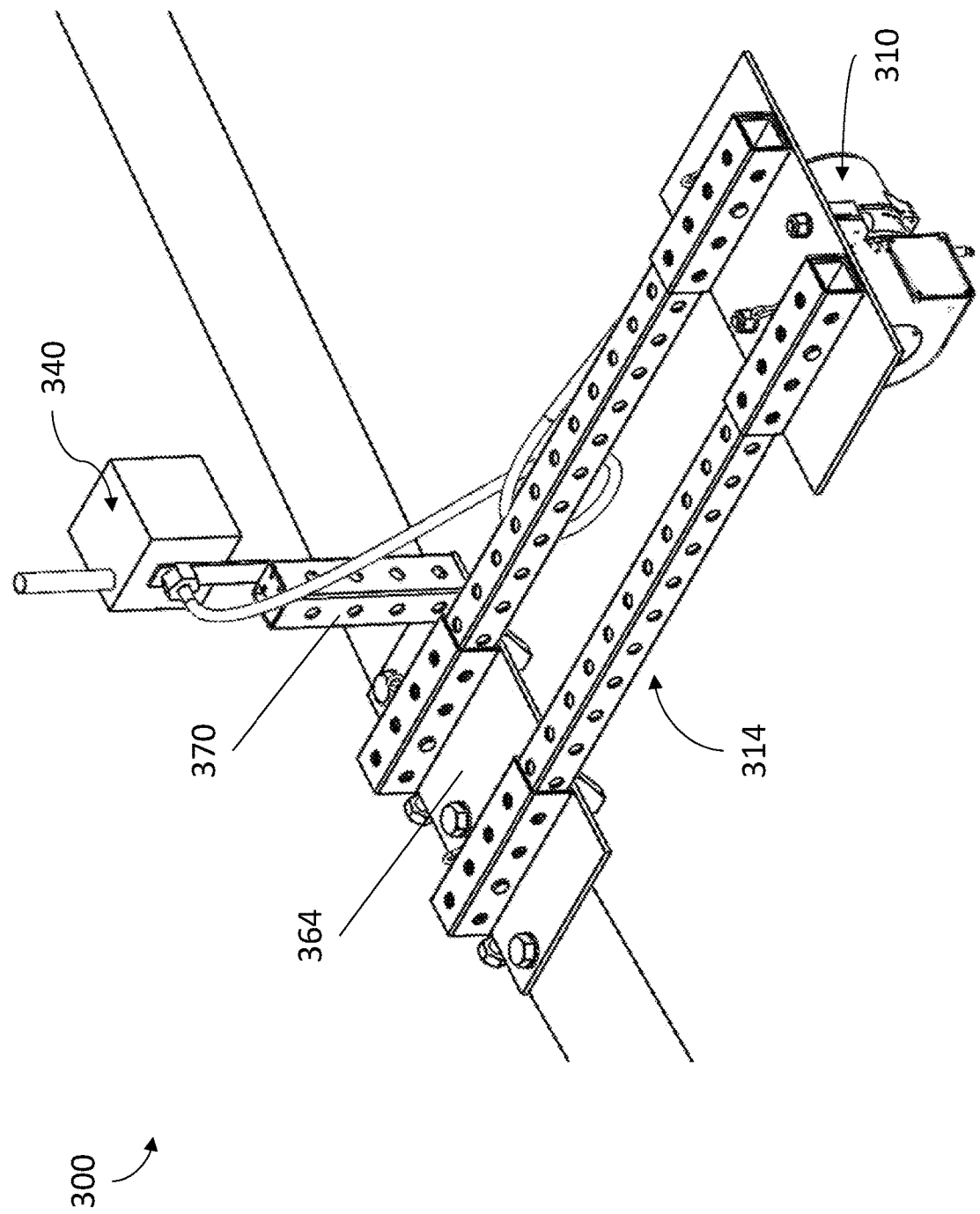
FIG. 3 illustrates a top perspective view of a floating roof monitoring system having a measuring device and support structure attached to a floating roof tank edge, according to another exemplary embodiment.

FIG. 3 shows a floating roof monitoring system 300 having a transducer measuring device 310 and support structure 314 for attachment to a floating roof tank edge (not shown). The floating roof monitoring system 300 is the same as that described above with regard to floating roof monitoring system 200, except as specifically stated below. For the sake of brevity, the similarities will not be repeated hereinbelow. Referring now to FIG. 3, a wireless transmitter 340 is attached to an extendible bracket 370 coupled to a mounting bracket 364 of the support structure 314. The wireless transmitter 340 may be secured to the extendible bracket 370 by any suitable means, such as nuts, bolts, rivets, welded brackets, studs, glue, or other suitable adhesive. The height of the extendible bracket 370 may be adjusted to elevate the position of the wireless transmitter 340 for improved radio communications (reception/transmission). The support structure 314 is located at the top perimeter of the tank and attached to an edge by adjusting a mounting bracket 364 to firmly attach the support to the tank perimeter.

The use of wire drawn transducers as the system measuring devices may also provide advantageous electrical bonding of the roof structure to the tank shell to prevent a charge difference creating potential for a spark between the two separate metal structures. While such bonding may already be accomplished through several different mechanical connections typically in place for storage tanks, e.g., a rolling roof ladder that touches both structures, bonded roof drain hoses that connect to both structures, and metal shunts on the secondary seals that make contact with the tank shell, the wire drawn connection may nonetheless provide additional electrical bonding and protection against charge differences.

Installation of the measuring devices around the perimeter of the storage tank may include calibration of the measuring device to establish a zero position for the device. The zero position may correspond to any location of the floating roof or the reference location for the measuring device and allows for the relative position of the roof to be determined during operation. In the case of a wire drawn transducer, the zero position may be the extended wire length when the roof is at the upper extent of the roof travel, i.e., when the storage tank is full, or at the lowest extent of the roof travel, i.e., when the tank is operationally empty. It may also be the output value from a wire drawn transducer measuring device when the wire is fully retracted into the device housing.

During normal operation of the monitoring system, the output value from the measuring device varies linearly in relation to movement of the floating roof. Output values from the device are provided to the transmitter and then to a monitoring, recording, or control device, or to a computer network gateway. A computer monitoring or control program may be used to log the device measurement information and to perform calculations to determine the roof position and inclination based on the measurements. Predetermined set points or ranges based on roof position or inclination values may also be associated with one or more alarm conditions and may be integrated with control actions for operation of the storage tank.

For example, since storage tanks are frequently required to have independent high level alarms as a backup to a primary level gauging system, the invention may be used to provide secondary or tertiary level alarms to warn of potential tank overfill. The system and method may also be used to provide alarms for other conditions where the roof position exceeding a set point range may present certain risks and potential for damage to the roof or tank equipment, e.g., including low level roof operation or excessive inclination.

The foregoing description of the invention, including specific embodiments, is primarily for illustrative purposes, it being recognized that a number of variations might be used which would still incorporate the essence of the invention. Reference should be made to the following claims in determining the scope of the invention.

What is claimed is:

1. A system for monitoring a floating roof of a liquid storage tank comprising:
    at least three linear position mechanical measuring devices for measuring the vertical distance from a proximal reference location for each measuring device to a vertically-aligned distal location at a top of the floating roof, wherein the measuring devices are spaced around and installed at or near a top perimeter of the storage tank, and wherein each measuring device is configured to provide vertical distance measurement information to a monitoring, recording, or transmitting device;
    a support structure for each of the at least three measuring devices; each support structure attaching one of the measuring devices to the storage tank at or near the top perimeter of the storage tank, wherein each measuring device connects to one of the support structures and each support structure connects to the storage tank; and
    a transmitter for receiving the vertical distance measurement information from one or more of the measuring devices and for transmitting the information.

2. The system of claim 1, wherein each measuring device provides the vertical distance information to determine the floating roof position and the inclination of the roof relative to horizontal level.

3. The system of claim 1, wherein each measuring device comprises an extendible wire or cable that extends substantially vertically downward from the measuring device and is connected to the roof at the distal location at the top of the floating roof.

4. The system of claim 1, wherein each measuring device is a wire drawn linear position transducer.

5. The system of claim 4, wherein the wire drawn linear position transducer includes a sleep mode of operation.

6. The system of claim 1, wherein each measuring device provides an electrical output value that is linearly related to the vertical distance measurement from the reference location to the distal location at the top of the floating roof.

7. The system of claim 1, wherein each measuring device reference location is the zero position of the measuring device.

8. The system of claim 1, wherein each measuring device reference location is a proximal location at the top of the storage tank.

9. The system of claim 1, wherein each measuring device reference location is a proximal location at the top edge of the storage tank.

10. The system of claim 1, wherein each of the measuring devices are substantially equally spaced around the top perimeter of the storage tank.

11. The system of claim 1, wherein the support structure has a length adjustable from 0.5 m to 2 m.

12. The system of claim 1, wherein the support structure has a length adjustable from 0.5 m to 1 m.

13. The system of claim 1, wherein the support structure is configured for distal attachment of the support structure to the top of the storage tank.

14. The system of claim 1, wherein the support structure is configured for proximal attachment of the measuring device to the support structure.

15. The system of claim 1, wherein the transmitter is configured to transmit the vertical distance measurement information to a monitoring, recording, or control device, or to a computer network gateway.

16. The system of claim 1, wherein the transmitter is configured to receive an output value from each measuring device and to transmit the value to a monitoring, recording, or control device, or to a computer network gateway.

17. The system of claim 1, wherein the transmitter is externally wireless and is configured to transmit the vertical distance measurement information wirelessly to a computer network gateway.

18. A method for monitoring a floating roof of a liquid storage tank comprising:
  deploying at or near a top perimeter of the liquid storage tank at least three linear position mechanical measuring devices for measuring the vertical distance from a proximal reference location for each measuring device to a vertically-aligned distal location at the top of the floating roof, wherein each measuring device is configured to provide vertical distance measurement information to a monitoring, recording, or transmitting device;
  deploying a transmitter at the top of the storage tank for receiving the vertical distance measurement information from one or more of the measuring devices and for transmitting the information to a monitoring, recording, or control device, or to a computer network gateway;
  obtaining linear position output information from the one or more measuring devices and providing the linear position output information to the transmitter; and
  transmitting the linear position output information received by the transmitter to the monitoring, recording, or control device, or to the computer network gateway.

19. The method of claim 18, further comprising applying the linear position output information received to determine position or inclination values of the floating roof within the storage tank.

20. The method of claim 19, further comprising comparing the position or inclination values to pre-determined set point ranges for an alarm status change to determine if the values are within or exceed the set point ranges; and updating the alarm status for the floating roof position or inclination.

* * * * *